United States Patent
Wang et al.

(10) Patent No.: US 10,942,332 B2
(45) Date of Patent: Mar. 9, 2021

(54) LENS DRIVE MOTOR, CAMERA AND MOBILE TERMINAL APPARATUS

(71) Applicant: Shanghai Billu Electronics Co., Ltd., Shanghai (CN)

(72) Inventors: Jianhua Wang, Shanghai (CN); Gaofeng Gong, Shanghai (CN); Linjun Ma, Shanghai (CN)

(73) Assignee: Shanghai Billu Electronics Co., Ltd., Shanghai (CN)

( * ) Notice: Subject to any disclaimer, the term of this patent is extended or adjusted under 35 U.S.C. 154(b) by 144 days.

(21) Appl. No.: 16/192,811

(22) Filed: Nov. 16, 2018

(65) Prior Publication Data
US 2020/0012072 A1 Jan. 9, 2020

(30) Foreign Application Priority Data
Jul. 4, 2018 (CN) .......................... 201810725741.4

(51) Int. Cl.
- *G02B 7/10* (2021.01)
- *G02B 7/02* (2021.01)
- *G06F 1/16* (2006.01)

(52) U.S. Cl.
CPC ............ *G02B 7/102* (2013.01); *G02B 7/025* (2013.01); *G02B 7/026* (2013.01); *G06F 1/1686* (2013.01)

(58) Field of Classification Search
CPC ...... C22B 11/048; C22B 11/06; Y02P 10/214; G02B 7/023; G02B 7/025; G02B 7/026;
(Continued)

(56) References Cited

U.S. PATENT DOCUMENTS

| 2010/0014176 A1 | 1/2010 | Wang | |
| 2010/0149667 A1* | 6/2010 | Wada | G02B 13/0035 359/824 |

(Continued)

FOREIGN PATENT DOCUMENTS

| CN | 207366907 U | 5/2018 |
| CN | 108181698 A | 6/2018 |

(Continued)

OTHER PUBLICATIONS

Supplemental EP Search Report dated Jun. 5, 2019 re: Application No. 18208086.1, pp. 1-10.

*Primary Examiner* — Joseph P Martinez
*Assistant Examiner* — Vipin Patel
(74) *Attorney, Agent, or Firm* — Gang Yu

(57) ABSTRACT

Provided are a lens drive motor, a camera and a mobile terminal apparatus. The lens drive motor includes a housing, a lens support, a coil and a magnet component; the coil is wrapped around the lens support and is provided in the housing; the magnet component includes multiple sub-magnets; the multiple sub-magnets are sequentially arranged around a circumferential direction of the coil and are positioned in the housing, wherein each of at least two first sub-magnets of the multiple sub-magnets is of a bent type structure; multiple straight edge segments and multiple corner segments connecting the multiple straight edge segments are included at an outer periphery of the lens support; and outsides of the multiple straight edge segments are covered by the multiple sub-magnets. According to the lens drive motor, a problem of insufficient driving force of the lens drive motor in the related art is solved.

18 Claims, 7 Drawing Sheets

(58) Field of Classification Search
CPC ......... G02B 7/08; G02B 7/102; G06F 1/1686;
H02K 33/02; H02K 41/0356
See application file for complete search history.

(56) References Cited

U.S. PATENT DOCUMENTS

2013/0170040 A1* 7/2013 Yu .......................... G02B 7/08
359/557
2013/0175885 A1 7/2013 Yu
2019/0011723 A1 1/2019 Park et al.

FOREIGN PATENT DOCUMENTS

| EP | 3438720 A1 | 2/2019 |
| WO | 2017119760 A1 | 7/2017 |
| WO | 2018086407 A1 | 5/2018 |

* cited by examiner

LENS DRIVE MOTOR, CAMERA AND MOBILE TERMINAL APPARATUS

TECHNICAL FIELD

The present disclosure relates to the technical field of photographic equipment, and more particularly, to a lens drive motor, a camera, and a mobile terminal apparatus.

BACKGROUND

Since a mobile terminal apparatus such as a mobile phone universally requires a light and thin structure, a higher demand for motor design under a given overall dimension is pushed forward, and a thin motor is difficult to universally meet various performance requirements. Among them, the most obvious problem is that the thinner the motor design, the more insufficient a driving force for driving a lens to move.

On the other hand, in order to obtain a high-resolution image photographing effect, the requirement on a photographing lens carried by the mobile phone, a camera and the like is increasingly high. At present, it is a relatively direct and effective manner to configure a relatively large lens on the camera, thereby obtaining a high-resolution image. As everyone knows, the larger the carried lens, the higher the demand on the driving force for driving the lens. However, on the premise of thinning the mobile phone, the research and development of a large driving force motor are often limited to a certain extent, it is difficult to effectively drive a lens with a relatively large weight to an ideal effect and thus the imaging effect of an image is affected.

Therefore, a lens drive motor has a problem of insufficient driving force in the related art.

SUMMARY

Some embodiments of the present disclosure provide a lens drive motor, a camera and a mobile terminal apparatus, so as to solve a problem of insufficient driving force of the lens drive motor in the related art.

To this end, according to an embodiment of the present disclosure, there is provided a lens drive motor, which includes: a housing, a lens support, a coil and a magnet component; the coil is wrapped around the lens support and is provided in the housing; the magnet component includes multiple sub-magnets; the multiple sub-magnets are sequentially arranged around a circumferential direction of the coil and are positioned in the housing, wherein each of at least two first sub-magnets of the multiple sub-magnets is of a bent type structure; multiple straight edge segments and multiple corner segments connecting the multiple straight edge segments are included at an outer periphery of the lens support; and outsides of the multiple straight edge segments are covered by the multiple sub-magnets.

In an exemplary embodiment, each of at least two second sub-magnets of the multiple sub-magnets is of a straight line type structure, and the at least two second sub-magnets are symmetrically arranged at two sides of the lens support.

In an exemplary embodiment, each of the at least two first sub-magnets and each of the at least two second sub-magnets are arranged alternately in turn.

In an exemplary embodiment, the multiple sub-magnets are two the first sub-magnets and two the second sub-magnets.

In an exemplary embodiment, each of the at least two first sub-magnets includes a main body segment and an extending segment connected sequentially; an included angle is formed between the extending segment and the main body segment; the main body segment covers corresponding one straight edge segment of the multiple straight edge segments; the extending segment stretches out to corresponding one of the multiple corner segments; a first end of each of the at least two second sub-magnets has a first distance L1 with an end portion of the main body segment of a first sub-magnet adjacent to the first end; a second end of the each of the at least two second sub-magnets has a second distance L2 with an end portion of the corner segment of another first sub-magnet adjacent to the second end; and the first distance L1 is greater than the second distance L2.

In an exemplary embodiment, the first distance L1 is greater than or equal to 0.5 mm and is smaller than or equal to 3.5 mm.

In an exemplary embodiment, the second distance L2 is greater than or equal to 0.2 mm and is smaller than or equal to 1.5 mm.

In an exemplary embodiment, at least one of the multiple corner segments of the lens support is provided with a wrapping post; and the multiple sub-magnets are provided in avoidance of the wrapping post.

In an exemplary embodiment, the housing is made of a Steel Plate Cold rolled Commercial (SPCC) material.

In an exemplary embodiment, the lens drive motor further includes an upper spring positioned above the lens support, and a lower spring positioned below the lens support; and at least one glue hole is formed at vortex corners of the upper spring.

In an exemplary embodiment, the upper spring is provided with a central hole and a plurality of second glue holes positioned outside the central hole; and the second glue holes are close to the central hole relative to the at least one glue hole.

In an exemplary embodiment, an upper end surface of the lens support is provided with a plurality of glue storing portions; and the glue storing portions are arranged corresponding to the second glue holes.

In an exemplary embodiment, the lens drive motor further includes a pedestal; the housing is provided on the pedestal to form an accommodating space therebetween; the lens support, the coil and the magnet component are, positioned in the accommodating space; and, the housing and the pedestal are assembled together via a plurality of embedment structures.

In an exemplary embodiment, the pedestal is provided with a central avoidance opening and a dustproof ring; and the dustproof ring extends along a circumferential direction of the central avoidance opening.

In an exemplary embodiment, each of the plurality of embedded structures includes; a gap portion provided on the housing, and a projection portion; and the projection portion is arranged at an outer periphery of the pedestal and is able to embedded into the gap portion.

In an exemplary embodiment, the gap portion is positioned at a vortex corner of the housing.

In an exemplary embodiment, the lens support is provided with a wire wrapping area; a plurality of limiting ridges for stopping the coil are provided in the wire wrapping area; a plurality of anti-impact ridges are further provided in the wire wrapping area; and the coil is wrapped in the wire wrapping area to cover the anti-impact ridges.

In an exemplary embodiment, multiple positioning posts are provided on a lower end surface of the lens support; the lower spring is provided with multiple positioning holes;

and the multiple positioning posts are cooperatively arranged with the multiple positioning holes.

In an exemplary embodiment, a thickness H1 of a corner portion of a peripheral wall of the housing is greater than a thickness H2 of other portions of the peripheral wall of the housing.

In an exemplary embodiment, a ratio of the thickness H2 to the thickness H1 is greater than 0.6 and is less than 1.

In an exemplary embodiment, the thickness H1 is greater than or equal to 0.2 mm and is smaller than or equal to 0.25 mm.

In an exemplary embodiment, the thickness H1 is equal to 0.2 mm.

In an exemplary embodiment, the thickness H2 is greater than or equal to 0.15 mm and is smaller than or equal to 0.2 mm.

In an exemplary embodiment, the thickness H1 is equal to 0.15 mm.

In an exemplary embodiment, the multiple sub-magnets are four first sub-magnets; and the four first sub-magnets are sequentially wrapped at an outer periphery of the lens support.

In an exemplary embodiment, the pedestal is provided with a recess; and the recess is arranged at a junction of the pedestal and the housing to form a glue injection groove.

According to another embodiment of the present disclosure, there is provided a camera, which includes the above-mentioned lens drive motor.

According to another embodiment of the present disclosure, there is provided a mobile terminal apparatus, which includes the above-mentioned camera.

In an exemplary embodiment, the mobile terminal apparatus includes at least one of a mobile phone, an information carrying terminal and, a notebook computer.

By applying the technical solutions of the present disclosure, the lens drive motor includes a housing, a lens support, a coil and a magnet component; the coil is wrapped around the lens support and is provided in the housing; the magnet component includes multiple sub-magnets; the multiple sub-magnets are sequentially arranged around a circumferential direction of the coil and are positioned in the housing, wherein each of at least two first sub-magnets of the multiple sub-magnets is of a bent type structure: multiple straight edge segments and multiple corner segments connecting the multiple straight edge segments are included at an outer periphery of the lens support; and outsides of the multiple straight edge segments are covered by the multiple sub-magnets.

In this way, by arranging the multiple sub-magnets sequentially around a circumferential direction of the coil, an effective action area between the magnet component and the coil can be increased, and a magnetic field intensity is improved; a driving force of the motor can be greatly increased, a relatively large driving force can be generated under an action of a very small current, and an energy consumption is reduced; and in addition, since the magnetic field intensity is effectively improved, a magnetic field component may be designed to be lighter and thinner, and thus a lens drive motor which is lighter and thinner can be designed and the aesthetics is improved.

BRIEF DESCRIPTION OF THE DRAWINGS

The accompanying drawings are described here to provide further understanding of the present disclosure, and form a part of the present disclosure. The schematic embodiments and description of the present disclosure are adopted to explain the present disclosure, and do not form improper limits to the present disclosure. In the drawings.

Figure 1:
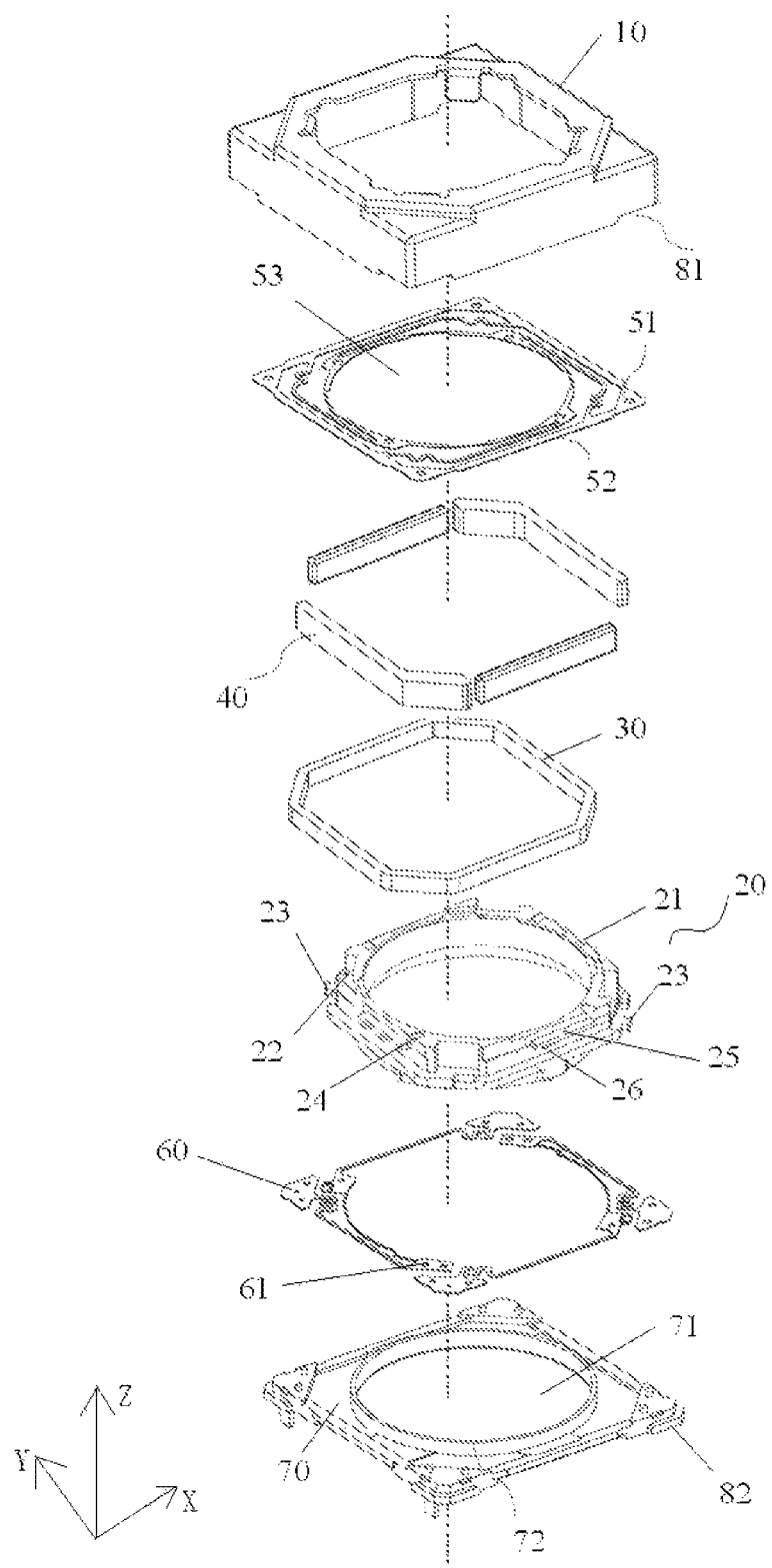
FIG. 1 shows an exploded view of a lens drive motor in a first embodiment of the present disclosure.

NUMERALS IN THE ACCOMPANYING DRAWINGS 10. a housing; 20. a lens support; 21, a straight edge segment; 22. a corner segment; 23. a wrapping post; 24. a glue storing portion; 25. a limiting ridge; 26. an anti-impact ridge; 30. a coil; 40. a magnet component; 50. an upper spring; 51. a first glue hole; 52. a second glue hole; 53. a central hole; 60. a lower spring; 61. a positioning hole; 70. a pedestal; 71. a central avoidance opening; 72. a dustproof ring; 81. a gap portion; 82. a projection portion; and 83. a glue injection groove.

DETAILED DESCRIPTION OF THE EMBODIMENTS

It is to be noted that the embodiments of the present application and the characteristics of the embodiments may be combined with each other if there is no conflict. The present disclosure will be described below with reference to the drawings and embodiments in detail.

It is to be noted that, unless otherwise specified, all technical and scientific terms used herein have the same meanings with those generally understood by those of ordinary skill in the art.

In the present disclosure, under the condition of not giving a reverse description, localizers such as "upper, lower, top and bottom" generally refer to directions shown in the accompanying drawings, or components in itself are on vertical, perpendicular or gravity direction. Likewise, to understood and describe conveniently, "inner and outer" refer to be inside and outside of an intrinsic outline of each component. However, the above localizers are not used to limit the present disclosure.

In order to solve a problem of insufficient driving force of a lens drive motor in the related art, some embodiments of the present disclosure provides a lens drive motor, a camera and a mobile terminal apparatus. Wherein, the camera is provided with the following lens drive motor, and the mobile terminal apparatus is provided with the camera.

Optionally, the mobile terminal apparatus includes at least one of a mobile phone, an information carrying terminal and a notebook computer.

As shown in FIG. 1 to FIG. 8, the lens drive motor includes a housing 10, a lens support 20, a coil 30 and a magnet component 40; the coil 30 is wrapped around the lens support 20 and is provided in the housing 10; the magnet component 40 includes multiple sub-magnets; the multiple sub-magnets are sequentially arranged around a circumferential direction of the coil 30 and are positioned in the housing 10, wherein each of at least two first sub-magnets of the multiple sub-magnets is of a bent type structure; multiple straight edge segments 21 and multiple corner segments 22 connecting the multiple straight edge segments 21 are included at an outer periphery of the lens support 20; and outsides of the multiple straight edge segments 21 are covered by the multiple sub-magnets.

In this way, by arranging the multiple sub-magnets sequentially around a circumferential direction of the coil 30, the effective action area between the magnet component 40 and the coil 30 can be increased, and the magnetic field intensity is improved; the driving force of the motor can be greatly increased; a relatively large driving force can be generated under the action of a very small current, and the energy consumption is reduced; and in addition, since the magnetic field intensity is effectively improved, a magnetic field component may be designed to be lighter and thinner, and thus a lens drive motor which is lighter and thinner can be designed and the aesthetics is improved.

As shown in FIG. 2 to FIG. 7, each of at least two second sub-magnets of the multiple sub-magnets is of a straight line type structure, and the at least two second sub-magnets are symmetrically arranged at two sides of the lens support 20. The second sub-magnets using the straight line type structure can form a relatively large effective action area for the coil 30 at two sides of the lens support 20, the magnetic field intensity is improved, the driving force of the motor can be greatly increased, a relatively large driving force can be generated under the action of a very small current, and the energy consumption is reduced.

Figure 2:
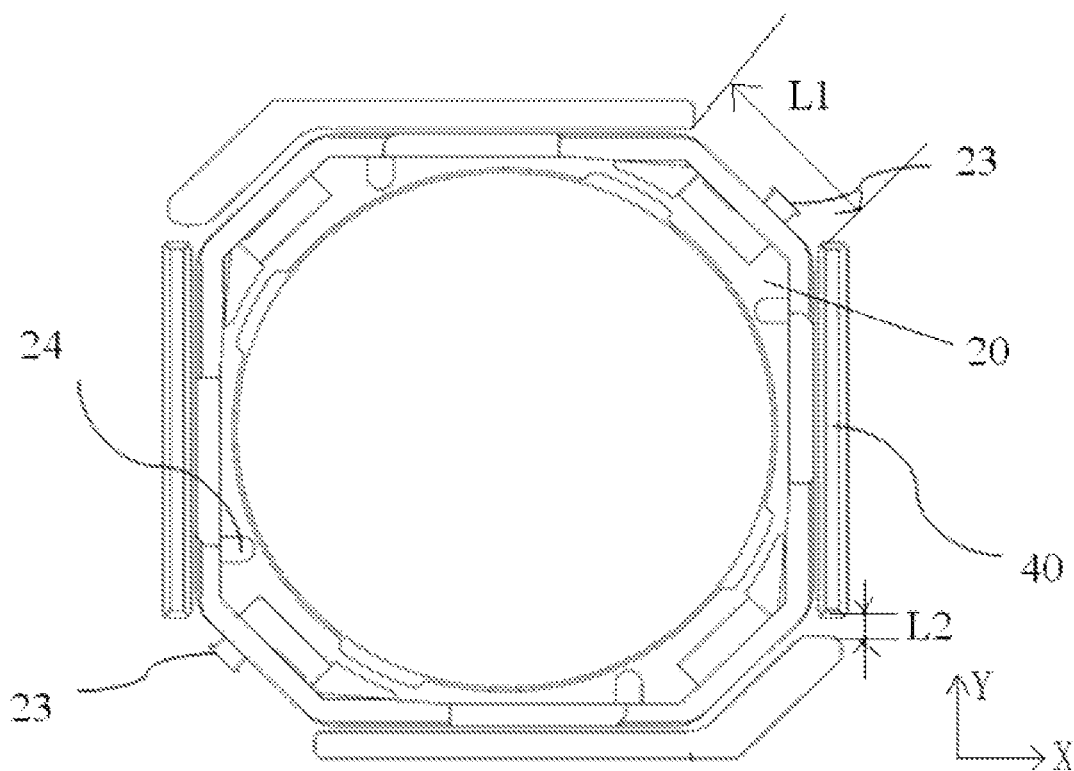
FIG. 2 shows a schematic diagram of a positional relationship between a magnet component and a lens support in the FIG. 1.
Figure 7:
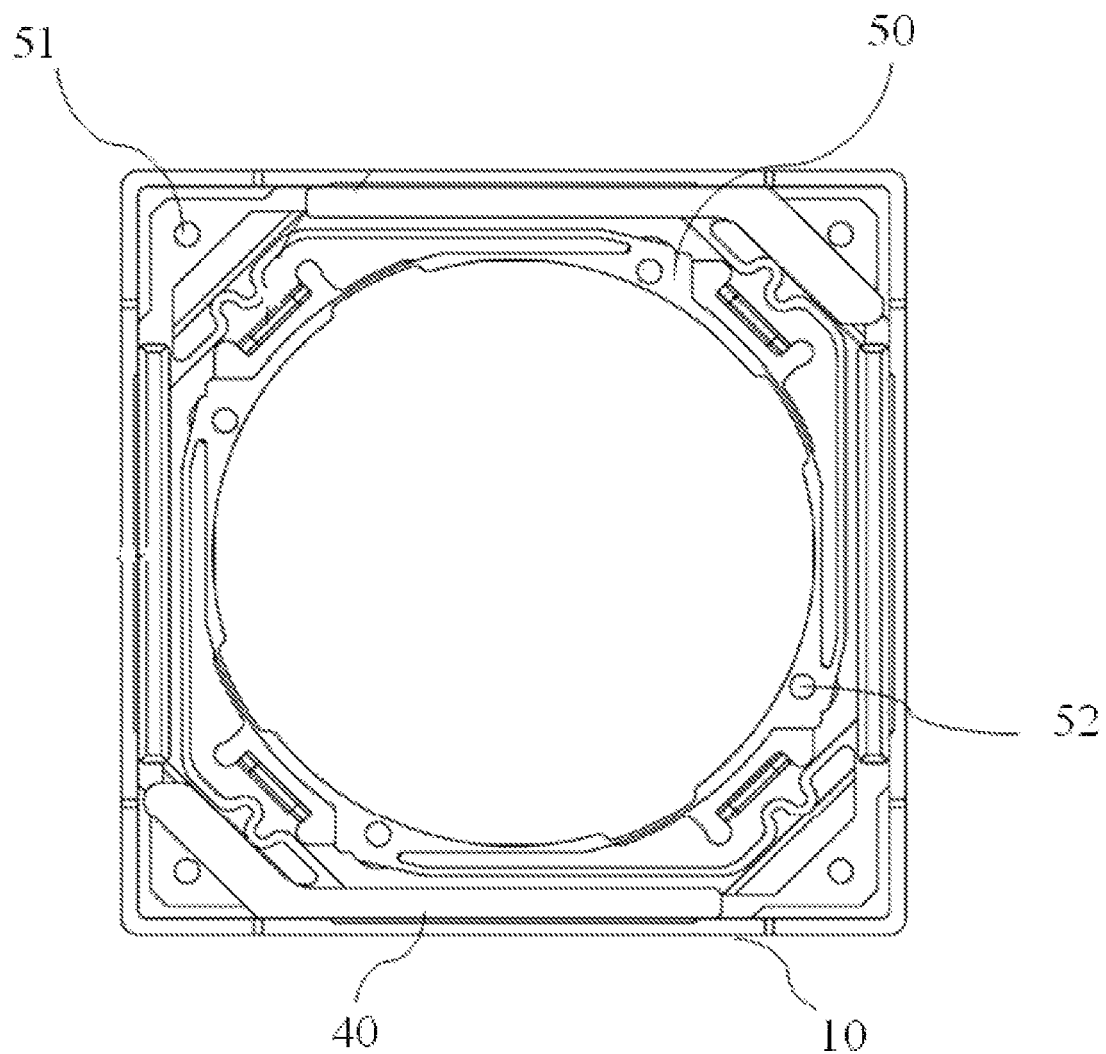
FIG. 7 is a schematic diagram of a connection relationship among a housing, an upper spring and a magnet component in the FIG. 1.
Figure 8:
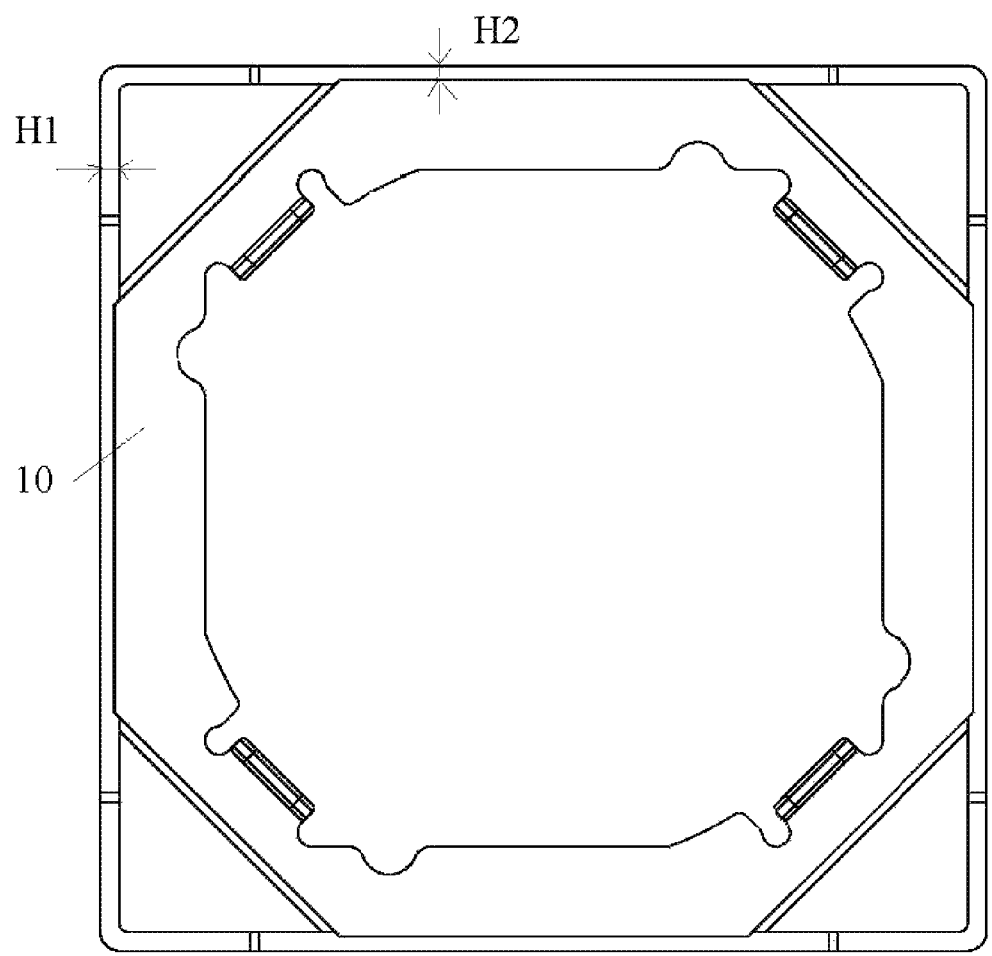
FIG. 8 is a structural schematic diagram of a housing in the FIG. 1.

In specific embodiments shown in FIG. 2 and FIG. 7, each of the at least two first sub-magnets and each of the at least two second sub-magnets are arranged alternately in turn. In this way, according to a form that the coil 30 is wrapped on the lens support 20, the magnet component 40 and the coil 30 can be matched to the greatest extent, thereby forming the largest effective action area and increasing the magnetic field intensity; and thus, the driving force of the motor can be greatly increased, a relatively large driving force can be generated under the action of a very small current, and the energy consumption is reduced.

In specific embodiments shown in FIG. 2 and FIG. 7, the multiple sub-magnets are two the first sub-magnets and two the second sub-magnets.

As shown in FIG. 2, each of the at least two first sub-magnets includes a main body segment and an extending segment connected sequentially; an included angle is formed between the extending segment and the main body segment; the main body segment covers corresponding one straight edge segment of the multiple straight edge segments 21; the extending segment stretches out to corresponding one of the multiple corner segments 22; a first end of each of the at least two second sub-magnets has a first distance L1 with an end portion of the main body segment of a first sub-magnet adjacent to the first end; a second end of the each of the at least two second sub-magnets has a second distance L2 with an end portion of the corner segment 22 of adjacent the other first sub-magnet of the two sub-magnets; and the first distance L1 is greater than the second distance L2. Since the main body segment covers corresponding one straight edge segment of the multiple straight edge segments 21, and the extending segment stretches out to corresponding one of the multiple corner segments 22, the first sub-magnets can be matched with the coil 30 at the multiple straight edge segments 21 and the corner segments 22, so that the effective action area between the magnet component 40 and the coil 30 is increased, the magnetic field intensity is improved, and the driving force of the motor is increased; and since the first end of each of the multiple sub-magnets in the straight line type structure has the first distance L1 with the end portion of the main body segment of a first sub-magnet adjacent to the first end, an avoidance space is provided for a connection between the coil 30 and an external structure to guarantee the reliability and the safety of the connection.

Optionally, the first distance L1 is greater than or equal to 0.5 mm and is smaller than or equal to 3.5 mm. In such a manner, on the basis of guaranteeing the reliability and the safety of the connection between the coil 30 and the external structure, the coverage range of a magnet is increased as much as possible to better maximize the effective action area between the coil 30 and the magnet component 40, improve the magnetic field intensity and increase the driving force of the motor.

Preferably, the first distance L1 is equal to 1.7 mm.

Optionally, the second distance L2 is greater than or equal to 0.2 mm and is smaller than or equal to 1.5 mm. In such a manner, the distances between the first sub-magnets and the second sub-magnets can be reduced to the greatest extent to better maximize the effective action area between the coil 30 and the magnet component 40, improve the magnetic field intensity and increase the driving force of the motor.

Preferably, the second distance L2 is equal to 0.25 mm.

Figure 3:
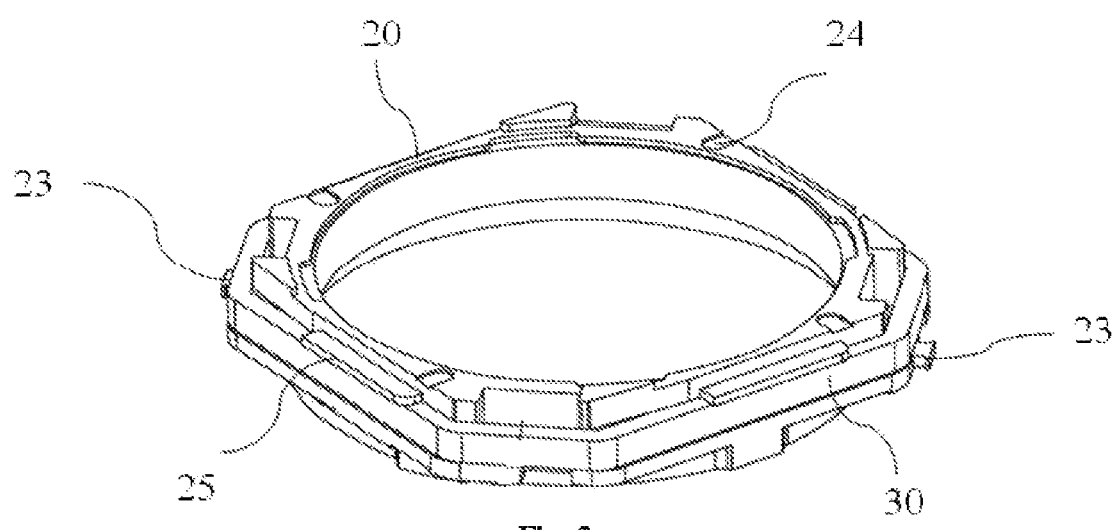
FIG. 3 shows a schematic diagram of a connection relationship between a coil and a lens support in the FIG. 1.
Figure 4:
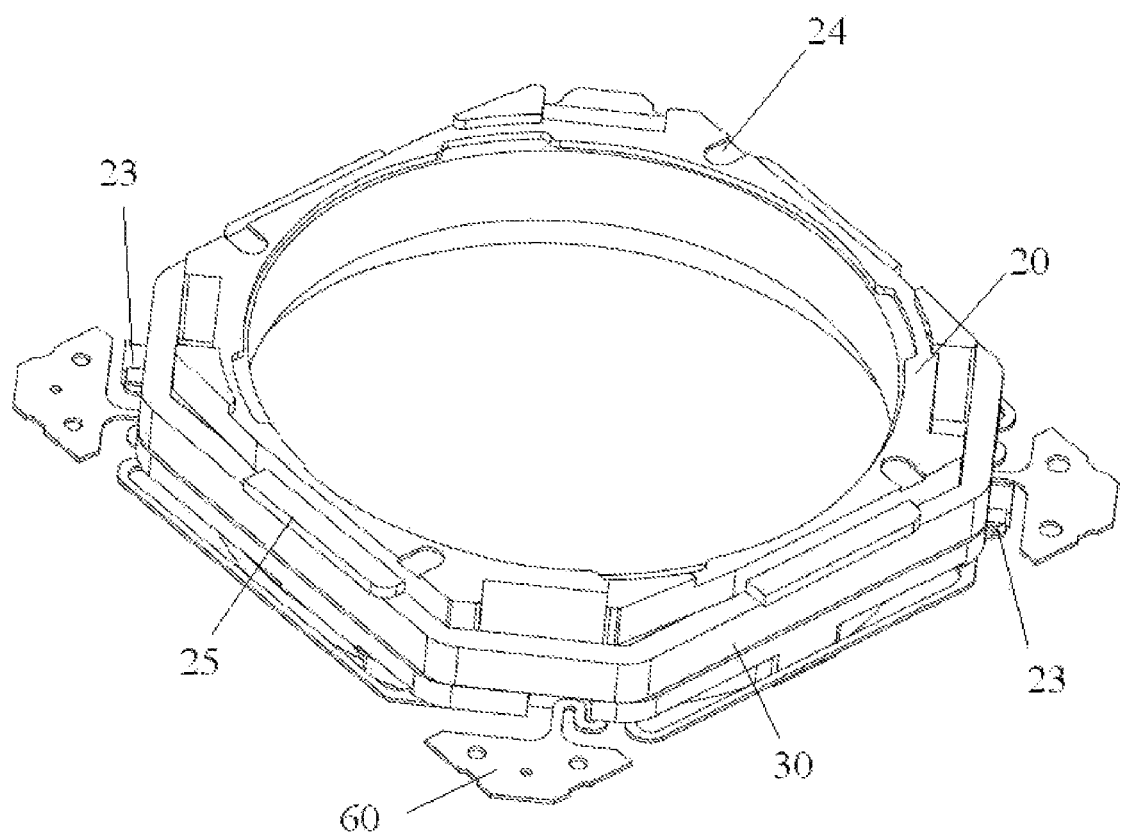
FIG. 4 is a schematic diagram of a connection relationship among a lower spring, a coil and a lens support in the FIG. 1.

As shown in FIG. 2 and FIG. 3, at least one of the multiple corner segments 22 of the lens support 20 is provided with a wrapping post 23; and the multiple sub-magnets are provided in avoidance of the wrapping post 23. The wrapping post 23 is configured to fix two ends of the coil 30, thus preventing the lens drive motor from dropped off in movement and taking a certain protective effect.

Besides, by arranging the wrapping post 23 of the lens support 20 at the corner segments 22, the space structure of the motor is effectively utilized and there is no need to additionally increase the size of the motor. By virtue of these structural characteristics, the motor design is compact and reasonable, and the purpose of miniaturization is achieved. As initial and tail ends of the coil 30 are respectively wrapped on the wrapping post 23, the first distance L1 can provide an avoidance space for connections between the initial and tail ends of the coil 30 and the wrapping post 23 of the lens support 20, and more importantly, provides an avoidance space for the wrapping post 23 of the lens support 20. When the coil 30 is powered on, the lens support 20 is moved along the direction of a Z optical axis and thereafter the wrapping post, on the lens support 20 need to have a sufficient movement avoidance space on the direction of the Z optical axis. Therefore, the first distance L1 is needed and the first distance 1_1 should be greater than width distances of the wrapping post on X-axis and Y-axis directions.

Optionally, the housing 10 is made of an SPCC material. The SPCC has the effect of resisting flux leakage and may also be anti-static. It protects the magnet component 40 well, so that the magnetic field intensity between the magnet component 40 and the coil 30 is improved, the driving force of the motor is increased and the cost is relatively low.

It is to be noted that, the housing 10 is not limited to be made of the SPCC material. As long as the performance of the SPCC material can be met, materials having a positive effect to resist the flux leakage all can be selected to manufacture the housing 10 of the present disclosure.

As shown in FIG. 1, the lens drive motor further includes upper spring 50 positioned above the lens support 20, and a lower spring 60 positioned below the lens support 20; and at least one glue hole 51 is formed at vortex corners of the upper spring 50. The upper spring 50 is configured to support an upper end surface of the lens support 20 and the lower spring 60 is configured to support a lower end surface of the lens support 20. Since the at least one glue hole 51 is formed at the vortex corners of the upper spring 50, the upper spring 50 and the lens support 20 can be fixedly connected via a manner of injecting a glue to improve the anti-impact capacity of the lens drive motor and improve the stability. Moreover, by injecting the glue into the at least one glue hole 51, the spillover can be prevented from affecting the performance of other structures.

In additional, the multiple sub-magnets provided in pairs are formed into 180° one another and are arranged oppositely. After a current is charged to the coil 30, an electromagnetic force is generated between the coil 30 and the magnet component 40. According to the Flemming's left-hand rule, due to the action of the electromagnetic force, the lens support 20 is driven to move linearly along an optical axis direction of the lens, and the lens support 20 is finally stayed at a position where the electromagnetic force between the coil 30 and the magnet is in a balanced state with the resultant force of elastic forces of the upper spring 50 and the lower spring 60. By charging a given current to the coil 30, the lens support 20 can be controlled to move to a target position, thus achieving the focusing purpose.

In specific embodiments shown in FIG. 1 and FIG. 7, the upper spring 50 is provided with a central hole 53 and a plurality of second glue holes 52 positioned outside the central hole 53; and the second glue holes 52 are close to the central hole 53 relative to the at least one glue hole 51. The central hole 53 is configured to avoid the lens. As the upper spring 50 is provided with the second glue holes 52, the upper spring 50 and the lens support 20 can be fixedly connected via a manner of injecting a glue to improve the anti-impact capacity of the lens drive motor and better the stability. Moreover, by injecting the glue into the at least one glue hole 51, the spillover can be prevented from affecting the performance of other structures.

In specific embodiments shown in FIG. 1, FIG. 3, FIG. 4 and FIG. 6, an upper end surface of the lens support 20 is provided with a plurality of glue storing portions 24; and the glue storing portions 24 are arranged corresponding to the second glue holes 52. Since the glue storing portions 24 are arranged corresponding to the second glue holes 52, the lens support 20 and the upper spring 50 may be connected via a manner of injecting the glue into the glue storing portions 24 and the second glue holes 52. In this way, the reliability of the connection may be increased, and the stability of the lens drive motor is improved.

Figure 5:
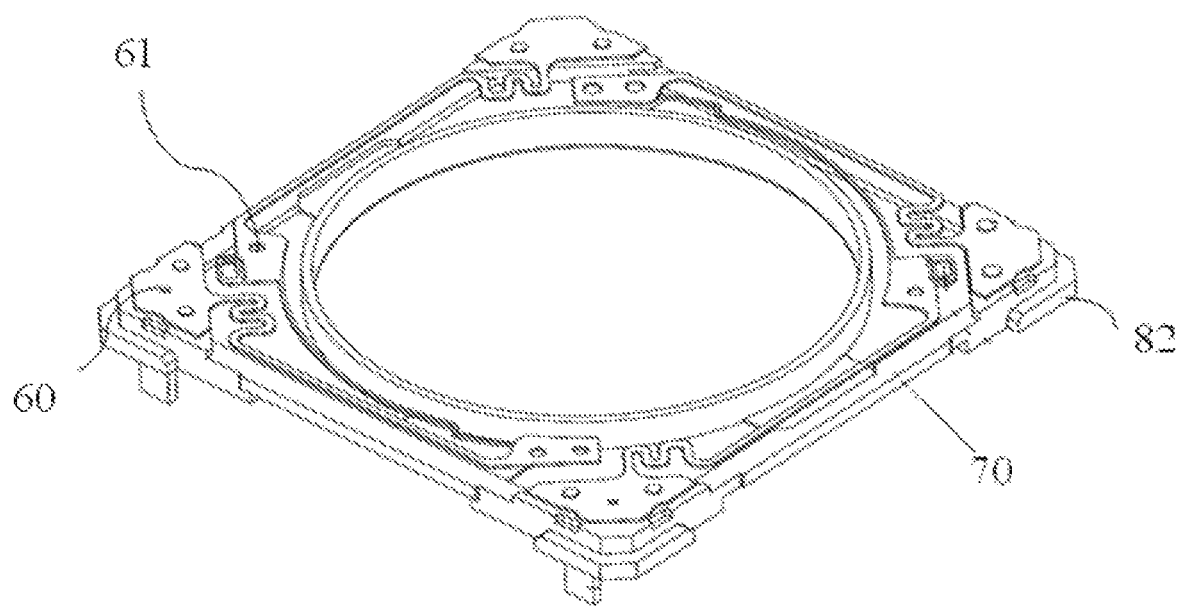
FIG. 5 is a schematic diagram of a connection relationship between a lower spring and a pedestal in the FIG. 1.
Figure 6:
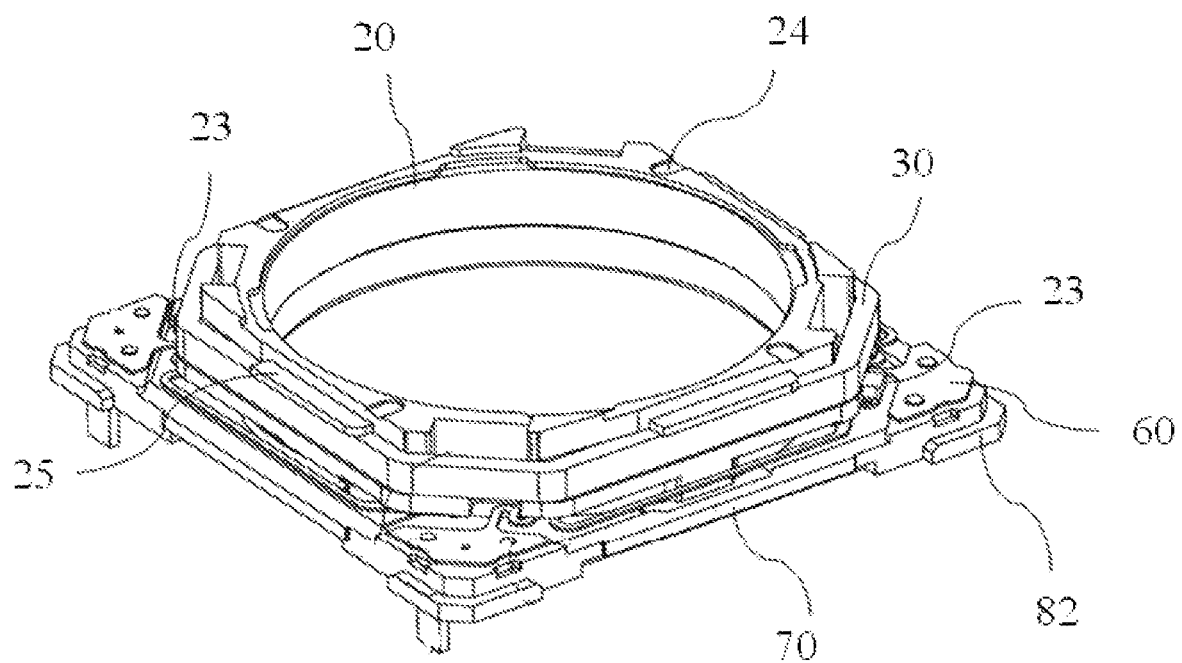
FIG. 6 is a schematic diagram of a connection relationship among a pedestal, a lower spring and a lens support in the FIG. 1.

As shown in FIG. 1, FIG. 5 and FIG. 6, the lens drive motor further includes a pedestal 70; the housing 10 is provided on the pedestal 70 to form an accommodating space therebetween; the lens support 20, the coil 30 and the magnet component 40 are positioned in the accommodating space; and the housing 10 and the pedestal 70 are assembled together via a plurality of embedment structures. The pedestal 70 is configured to support the lens support 20, the coil 30 and the magnet component 40, and under the joint action of the pedestal 70 and the housing 10, provides the accommodating space for the lens support 20, the coil 30 and the magnet component 40; furthermore, it can take the effect of protecting internal components. In addition, the housing 10 and the pedestal 70 are assembled together via the embedment structure, so the structure is simple, the operation is convenient, the assembly effect is good and the reliability and the stability are strong.

In a specific embodiment shown in FIG. 1, the pedestal 70 is provided with a central avoidance opening 71 and a dustproof ring 72; and the dustproof ring 72 extends along a circumferential direction of the central avoidance opening 71. The lens support 20 is provided with a holding cavity. The dustproof ring 72 stretches into the holding cavity of the lens support 20 and is combined with the holding cavity in, a noncontact staggered manner, so that very good dustproof effect can be taken.

As shown in FIG. 1, each of the plurality of embedded structures includes a gap portion 81 and a projection portion 82; the gap portion 81 provided on the housing 10; and the projection portion 82 is arranged at an outer periphery of the pedestal 70 and is able to embedded into the gap portion 81. The projection portion 82 and the gap portion 81 both are structured simply, can meet the requirement on the embedment and has, good assembly effect and strong reliability and stability.

In the specific embodiment shown in FIG. 1, the gap portion 81 is positioned at a vortex corner of the housing 10. In this way, the adverse effect to other components may be avoided, and the use performance of the lens drive motor is improved.

As shown in FIG. 1, FIG. 3, FIG. 4 and FIG. 6, the lens support 20 is provided with a wire wrapping area; a plurality of limiting ridges 25 for stopping the coil 30 are provided in the wire wrapping area; a plurality of anti-impact ridges 26 are further provided in the wire wrapping area; and the coil 30 is wrapped in the wire wrapping area to cover the anti-impact ridges 26. As the limiting ridge 25 is provided, the very good limiting and protecting effect can be taken on the coil 30. In addition, with the anti-impact ridges 26, the impact resistance between the wrapped coil 30 and the lens support 20 will be greatly enhanced; and therefore, even under the action of an external force, the coil 30 also will not be dropped from the lens support 20 and thus the reliability of the lens drive motor is improved.

In the specific embodiment shown in FIG. 1, multiple positioning posts are provided on a lower end surface of the lens support 20; the lower spring 60 is provided with multiple positioning holes 61; and the multiple positioning posts are cooperatively arranged with the multiple positioning holes 61. The lens support 20 and the lower spring 60 are cooperatively connected via the positioning posts and the positioning holes 61, so that the reliability of the assembly is increased and simultaneously the convenience in assembly may be improved.

As shown in FIG. 7, a thickness H1 of a corner portion of a peripheral wall of the housing 10 is greater than a thickness H2 of other portions of the peripheral wall of the housing 10. In this way, the better protective effect can be taken on the magnet component 40, the leakage of a magnetic field can be effectively avoided and the relatively strong magnetic field intensity is guaranteed; and thus, the motor is guaranteed to have the sufficient driving force and a relatively large driving force can be generated under the action of a very small current, thereby reducing the energy consumption.

In an exemplary embodiment, a ratio of the thickness H2 to the thickness H1 is greater than 0.6 and is less than 1. In such a manner, the housing 10 is guaranteed to have the relatively good intensity, the very good protective effect can be taken on the magnet component 40 and the leakage of the magnetic field is prevented; and meanwhile, the lens drive motor is guaranteed to have the light and thin characteristics.

In an exemplary embodiment, the thickness H1 is greater than or equal to 0.2 mm and is smaller than or equal to 0.25 mm. In this way, the better protective effect can be taken on the magnet component 40, the leakage of the magnetic field can be effectively avoided and the relatively strong magnetic field intensity is guaranteed; and thus, the motor is guaranteed to have the sufficient driving force and a relatively large driving force can be generated under the action of a very small current, thereby reducing the energy consumption.

It is to be noted that, with the utilization of structural characteristics of the motor and on the premise of not affecting the overall structural dimension of the motor, the thickness H1 of the corner portion of the peripheral wall of the housing 10 may further be improved. Increasing the thickness H1 is the most direct and obvious to enhance the flux leakage resistance of the motor and further accelerate the push effect of the motor. And meanwhile, the design requirement on lighting and thinning also can be met.

Preferably, the thickness H1 is equal to 0.2 mm. In such a manner, the housing 10 can be guaranteed to take the best protective effect on the magnet component 40, the flux leakage resistance is the best and the magnetic field intensity is the best.

Preferably, the thickness H2 is greater than or equal to 0.15 mm and is smaller than or equal to 0.2 mm. In this way, on the premise of meeting the use requirements, the thickness and the weight of the housing 10 are guaranteed to be in a relatively small range, the size of the housing 10 is reduced and thus the lens drive motor is relatively light and thin.

It is to be noted that, it is relatively difficult to change or increase the thickness H2 within a given compact and limited space range of the motor, and the involved influence range is relatively large. In order to obtain the relatively good flux leakage resistance, once the thickness H2 is changed, the sizes of all relevant components inside the housing 10 will be correspondingly adjusted and changed and the cost for such change is relatively high, Since the sizes of the coil 30 and the magnet component 40 are shrunken and are changed, the comprehensive result is unnecessarily in favor of improving the overall performance including the thrust performance of the motor and implementing standardization of motor products. On the basis of existing functional structures, the most reasonable and feasible way is to keep the thickness H2 unchanged and increase the thickness H1 Of course, on the basis of meeting various functions, it is also appropriate to enable the thickness H1 and the thickness H2 to be the same. The present disclosure is a technical improvement made for the purpose of improving the functions of the motor, and the thrust performance will be greatly improved compared with that ever before.

Preferably, the thickness H2 is equal to 0.15 mm. In this way, on the premise of meeting the use requirement, the thickness and the weight of the housing 10 can be guaranteed to be in an optimal range and the size of the housing 10 is reduced; and thus, the lighting and thinning degrees of the lens drive motor are optimal and the aesthetics is improved.

Figure 10:
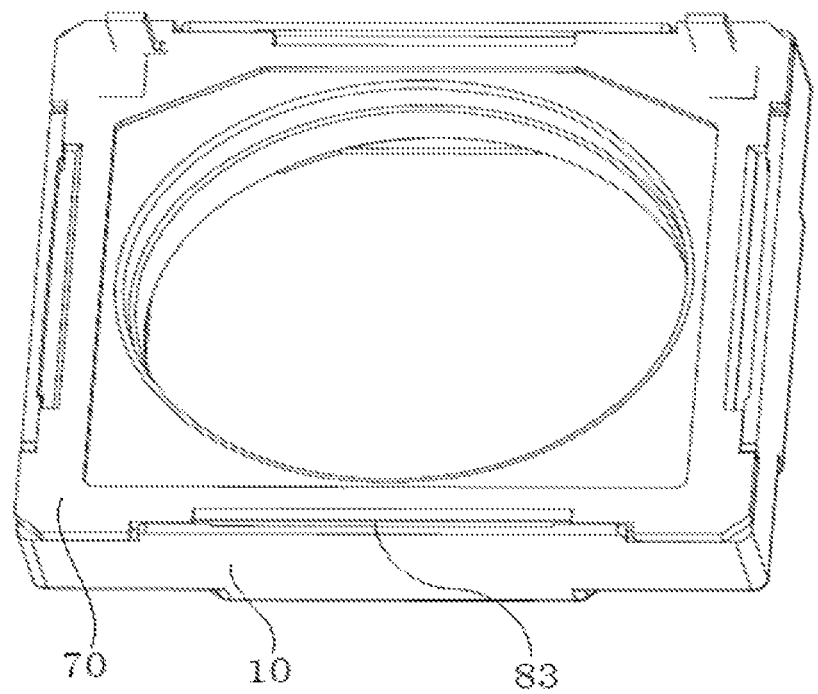
FIG. 10 depicts a structural schematic diagram of an installed lens drive motor in the FIG. 1.

As shown in FIG. 10, the pedestal 70 is provided with a recess; and the recess is arranged at a junction of the pedestal 70 and the housing 10 to form a glue injection groove 83. By injecting the glue into the glue injection groove 83, the housing 10 and the pedestal 70 are adhered firmly. Moreover, with the glue injection groove 83, the spillover of the glue is effectively prevented from affecting other components and products; and while the aesthetics of the motor can be guaranteed, the impact resistance of the motor is further enhanced.

It is to be noted that, the thicker the housing 10 corresponding to the magnet component 40 is, the less the lines of magnetic force are, and thus the adverse condition of the flux leakage can be more effectively prohibited. That is, under the condition of a same current, the higher the magnetic field intensity generated by the magnet component 40, the more obvious on improvement of the driving force of the motor. By improving the driving force, a lens with a relatively large weight can be carried and driven, a high-pixel lens drive motor is provided and the structural design on low current and miniaturization of the lens drive motor is implemented. To select the material of the housing 10, the selected thickness is 0.2 mm, the thickness H1 of the portion, corresponding to the magnet component 40, on the peripheral wall of the housing 10 is changed into 0.2 mm or more and the thickness of the housing 10 on the other portions is machined into 0.15 mm; the specific implementation manner is as follows: a 0.2 mm material strap is extruded via a mould by the housing 10 manufacturer into the thicknesses such as 0.15 mm. Therefore, compared with the former driving force, 25% driving force may be improved.

It is to be noted that, according to different structures of the motor, the configuration number of the first sub-magnets in the bent type structure or the second sub-magnets in the straight line type structure may be adjusted to achieve the optimal driving effect.

It is to be noted that, when the magnet component 40 and the housing 10 are attached, the compactness of the lens drive motor can be increased and the size of the lens drive motor is reduced; and when a gap is provided between the magnet component 40 and the housing 10, the glue is conveniently injected into the gap for adhering and fixing and thus the adhesiveness between the magnet component 40 and the housing 10 can be increased.

Embodiment 2

The difference with the first embodiment is that the structure of the magnet component is different.

Figure 9:
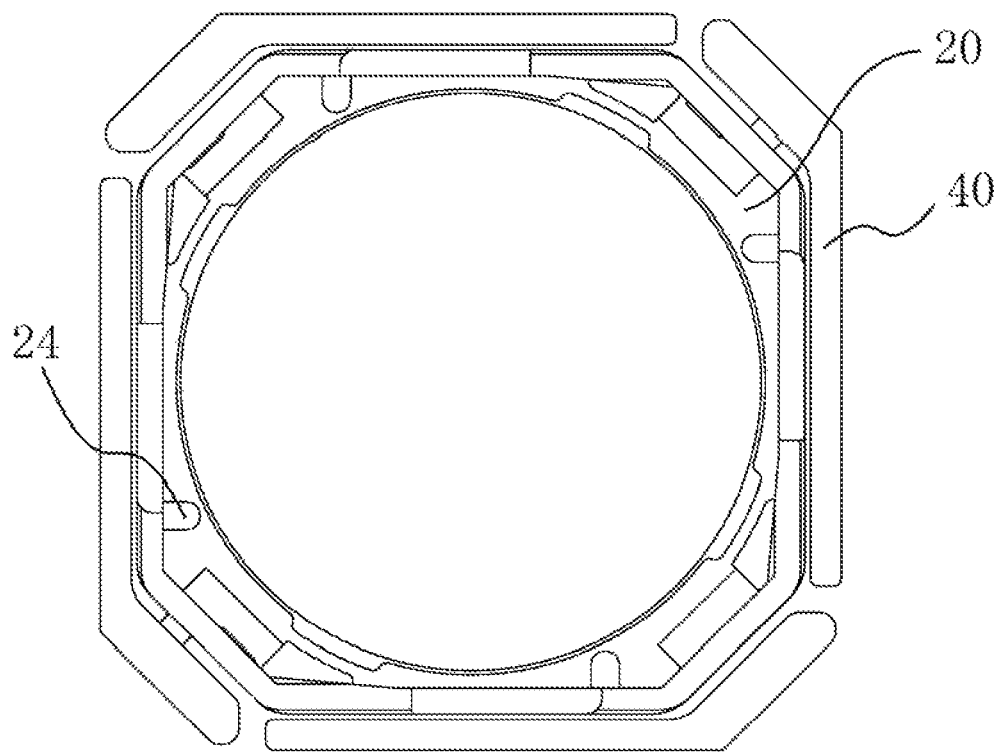
FIG. 9 depicts a schematic diagram of a positional relationship between a magnet component and a lens support in a second embodiment of the present disclosure.

As shown in FIG. 9, in this embodiment, the multiple sub-magnets are sequentially arranged by four the first sub-magnets. In this way, the periphery of the lens support 20 is entirely surrounded by the four first sub-magnets to improve the space distribution density of the multiple sub-magnets as much as, possible.

It is to be noted that, the magnet component surrounds the periphery of the lens support 20, so the positions of the wrapping post 23 need to be changed.

Specifically, wrapping posts 23 may be arranged on the upper and lower end surfaces of the lens support 20. In this way, the positions of the multiple sub-magnets will not be occupied and the configuration density of the multiple sub-magnets may be increased. However, the height of the whole lens drive motor will be increased.

In addition, the wrapping post may further be cancelled. In such a manner, the initial and tail ends of the coil may be directly welded on the lower spring and are electrically conducted. Although the structure is simple, the impact resistance of the lens drive motor is relatively weak.

Besides, it may further appropriate to design the lengths laterally extended by the wrapping post to be smaller than distances of the outer edge of the coil to the inner edges of the multiple sub-magnets on an optical axis direction. In this way, when the lens support is moved to the optical axis direction, the multiple sub-magnets thereon will not be interfered. However, the length, width and outline of the motor will be increased.

From the above descriptions, it may be seen that the above-mentioned embodiment of the present disclosure achieves the following technical effects.

1. The first sub-magnets and the second sub-magnets are arranged sequentially along a circumferential direction of the coil, so the effective action area between the magnet component and the coil can be increased, the magnetic field intensity is improved and the driving force of the motor can be greatly increased.

2. Since the magnetic field intensity is effectively improved, a magnetic field component may be designed to be lighter and thinner, and thus a higher and thinner lens drive motor can be designed and the aesthetics is improved.

3. Since the magnetic field intensity is increased, a relatively large driving force can be generated even under the action of a very small current and the energy consumption is reduced.

4. The structure is simple and the assembly is easy.

Apparently, the described embodiments are a part rather than all of the embodiments of the present disclosure. All other embodiments obtained by a person of ordinary skill in the art based on the embodiments of the present disclosure without creative efforts shall fall within the protection scope of the present disclosure.

It is to be noted that, terms used herein are used to merely describe specific embodiments and should not be construed as limiting the present disclosure. As used herein, unless the context clearly indicates otherwise, singular expressions should be interpreted to include plural expressions. In addition, it should be further understood that, the terms "include" and/or "comprise" in the specification may represent the existence of a feature, a step, an operation, a component, a part and/or the combination thereof.

It should be noted that, terminologies such as "first" and "second" in the specification, claims and accompanying drawings of the present disclosure are only used to distinguish similar objects, rather than to describe a special order or a precedence order. It should be understood that data used in such a way may be interchangeable in a certain cases, such that the embodiments of the present disclosure described here can be implemented in an order other than those illustrated or described here.

The above are only preferred embodiments of the present disclosure rather than limits to the present disclosure. To a person skilled in the art, the present disclosure may have various variations and changes. Any modification, equivalent replacement, improvement and the like made within the spirit and principle of the present disclosure should include in a scope of protection of the present disclosure.

What is claimed is:

1. A lens drive motor, wherein the lens drive motor comprises: a housing, a lens support, a coil and a magnet component, the coil being wrapped around the lens support and being provided in the housing, the magnet component comprising multiple sub-magnets, and the multiple sub-magnets being sequentially arranged around a circumferential direction of the coil and being positioned in the housing, wherein each of at least two first sub-magnets of the multiple sub-magnets is of a bent type structure;

multiple straight edge segments and multiple corner segments connecting the multiple straight edge segments are comprised at an outer periphery of the lens support; and outsides of the multiple straight edge segments are covered by the multiple sub-magnets, each of at least two second sub-magnets of the multiple sub-magnets is of a straight line type structure, and the at least two second sub-magnets are symmetrically arranged at two sides of the lens support, each of the at least two first sub-magnets and each of the at least two second sub-magnets are arranged alternately in turn, the multiple sub-magnets are two the first sub-magnets and two the second sub-magnets, each of the at least two first sub-magnets comprises a main body segment and an extending segment connected sequentially; an included angle is formed between the extending segment and the main body segment; the main body segment covers corresponding one straight edge segment of the multiple straight edge segments; the extending segment stretches out to corresponding one of the multiple corner segments; a first end of each of the at least two second sub-magnets has a first distance L1 with an end portion of the main body segment of a first sub-magnet adjacent to the first end; a second end of the each of the at least two second sub-magnets has a second distance L2 with an end portion of the corner segment of another first sub-magnet adjacent to the second end; and the first distance L1 is greater than the second distance L2.

2. The lens drive motor as claimed in claim 1, wherein the first distance L1 is greater than or equal to 0.5 mm and is smaller than or equal to 3.5 mm, and the second distance L2 is greater than or equal to 0.2 mm and is smaller than or equal to 1.5 mm.

3. The lens drive motor as claimed in claim 1, wherein at least one of the multiple corner segments of the lens support is provided with a wrapping post; and the multiple sub-magnets are provided in avoidance of the wrapping post.

4. The lens drive motor as claimed in claim 1, wherein the housing is made of a Steel Plate Cold rolled Commercial (SPCC) material.

5. The lens drive motor as claimed in claim 1, wherein the lens drive motor further comprises an upper spring positioned above the lens support, and a lower spring positioned below the lens support; and at least one glue hole is formed at vortex corners of the upper spring.

6. The lens drive motor as claimed in claim 5, wherein the upper spring is provided with a central hole and a plurality of second glue holes positioned outside the central hole; and the second glue holes are close to the central hole relative to the at least one glue hole, an upper end surface of the lens support is provided with a plurality of glue storing portions; and the glue storing portions are arranged corresponding to the second glue holes.

7. The lens drive motor as claimed in claim 1, wherein the lens drive motor further comprises a pedestal; the housing is provided on the pedestal to form an accommodating space therebetween; the lens support, the coil and the magnet component are positioned in the accommodating space; and the housing and the pedestal are assembled together via a plurality of embedment structures.

8. The lens drive motor as claimed in claim 7, wherein the pedestal is provided with a central avoidance opening and a dustproof ring; and the dustproof ring extends along a circumferential direction of the central avoidance opening.

9. The lens drive motor as claimed in claim 7, wherein each of the plurality of embedded structures comprises:
a gap portion provided on the housing; and
a projection portion, wherein the projection portion is arranged at an outer periphery of the pedestal and is able to embedded into the gap portion, the gap portion is positioned at a vortex corner of the housing.

10. The lens drive motor as claimed in claim 1, wherein the lens support is provided with a wire wrapping area; a plurality of limiting ridges for stopping the coil are provided in the wire wrapping area; a plurality of anti-impact ridges are further provided in the wire wrapping area; and the coil is wrapped in the wire wrapping area to cover the anti-impact ridges.

11. The lens drive motor as claimed in claim 4, wherein multiple positioning posts are provided on a lower end surface of the lens support; the lower spring is provided with multiple positioning holes (61); and the multiple positioning posts are cooperatively arranged with the multiple positioning holes (61).

12. The lens drive motor as claimed in claim 1, wherein a thickness H1 of a corner portion of a peripheral wall of the housing is greater than a thickness H2 of other portions of the peripheral wall of the housing.

13. The lens drive motor as claimed in claim 12, wherein a ratio of the thickness H2 to the thickness H1 is greater than 0.6 and is less than 1.

14. The lens drive motor as claimed in claim 12, wherein the thickness H1 is greater than or equal to 0.2 mm and is smaller than or equal to 0.25 mm; or the thickness H2 is greater than or equal to 0.15 mm and is smaller than or equal to 0.2 mm.

15. The lens drive motor as claimed in claim 1, wherein the multiple sub-magnets are four first sub-magnets; and the four first sub-magnets are sequentially wrapped at an outer periphery of the lens support.

16. The lens drive motor as claimed in claim 7, wherein the pedestal is provided with a recess; and the recess is arranged at a junction of the pedestal and the housing to form a glue injection groove.

17. A camera, wherein the camera comprises the lens drive motor as claimed in claim 1.

18. A mobile terminal apparatus, wherein the mobile terminal apparatus comprises the camera as claimed in claim 17, the mobile terminal apparatus comprises at least one of a mobile phone, an information carrying terminal and a notebook computer.

* * * * *